United States Patent [19]
Mascret

[11] 3,896,715
[45] July 22, 1975

[54] AUTOMATIC APPLIANCE FOR COOKING AND DISTRIBUTING MEASURED QUANTITIES OF HOT FOOD PRODUCTS

[76] Inventor: Albert Mascret, 84 rue Voltaire, 02100 Saint Quentin, France

[22] Filed: Nov. 22, 1972

[21] Appl. No.: 308,845

[30] Foreign Application Priority Data
Nov. 12, 1971 France .............................. 71.41395

[52] U.S. Cl. ...................... 99/356; 99/407; 221/299
[51] Int. Cl. ............................................ A47j 37/12
[58] Field of Search ............. 99/357, 404, 407, 352, 99/355, 356; 221/246, 299

[56] References Cited
UNITED STATES PATENTS

| | | | |
|---|---|---|---|
| 1,684,747 | 9/1928 | Stimpson | 221/299 |
| 2,293,073 | 8/1942 | Osborne et al. | 221/299 X |
| 2,532,894 | 12/1950 | Currier | 99/407 |
| 3,186,594 | 6/1965 | Nyblom | 221/299 |
| 3,398,672 | 8/1968 | Hoeberigs | 99/407 |
| 3,448,677 | 6/1969 | Dexters | 99/357 |
| 3,667,373 | 6/1972 | Sischer et al. | 99/407 |
| 3,690,247 | 9/1972 | Van Cleven | 99/357 |

Primary Examiner—Billy J. Wilhite

[57] ABSTRACT

Apparatus for cooking and distributing measured quantities of hot food products comprising a perforated basket having an aperture in which is mounted a chute for introducing food products into the interior of the basket, the basket and chute unit being mounted for movement between a first position in which the basket is immersed in a cooking liquid in a tank and a second position in which the basket is withdrawn from the tank. A rotatable wheel with radial partitions is mounted in the interior of the basket to divide the same into sectors, each of which is intended to contain one measured quantity of food product. A pivotable abutment is fixed in the tank to enter the basket through a slit therein and to effect rotation of the rotatable wheel to cause the partitions thereof to rotate through one sector each time the basket and chute unit undergoes one cycle of movement. As the basket moves from the second position to the first position and empty sector receives a predetermined portion of product and when the basket moves from the first position to the second position, cooked product from one of the sectors is delivered via the chute into an awaiting container.

12 Claims, 5 Drawing Figures

AUTOMATIC APPLIANCE FOR COOKING AND DISTRIBUTING MEASURED QUANTITIES OF HOT FOOD PRODUCTS

The present invention relates to apparatus for cooking predetermined measured quantities of hot food products and for distributing them to the public as cooking proceeds. Such apparatus is particularly suitable for distributing food products which must be consumed while thoroughly hot, such as chips, fritters, sausages and all other similar fried foods.

According to the invention there is provided apparatus for cooking and distributing measured quantities of hot food products, the apparatus comprising a tank for containing a hot cooking liquid; a basket and chute unit consisting of a perforated basket having an aperture and a chute in communication with the aperture for introducing food products into the interior of the basket and for removing food products therefrom; means for automatically and reciprocally moving the unit between a first position in which the basket is immersed in the cooking liquid and a second position in which the basket is withdrawn from the tank; means for partitioning the interior of the basket into sectors each intended to contain one measured quantity of food product, said partitioning means being mounted so as to be rotatable relative to the basket; a device for imparting rotation to said partitioning means to cause the partitioning means to rotate through one sector each time the basket and chute unit moves towards one of said positions of the basket; a magazine for containing a reserve of the food product to be cooked and provided with an aperture through which said product can pour and including means for driving the product towards said aperture; a twoposition product-measuring member which, in a first position, takes from the aperture of the magazine a predetermined portion of product, and in its second position allows said portion to pour into the chute of the basket, a driving mechanism for moving the measuring member in synchronism with the movement of the basket-and-chute unit; means for receiving a stack of receptacles each intended to receive a cooked portion of product which is tipped from one of the sectors of the basket; and a mechanism for distributing said receptacles in synchronism with the movement of the basket-and-chute unit and operable to bring an end receptacle from the stack into a position accessible to the consumer.

Thus the present apparatus enables the food products which are introduced by portions into the basket to be progressively cooked, and enables these portions to be distributed as their cooking proceeds, after they have been inserted a number of times in the cooking tank.

An embodiment of the invention will now be described by way of example only with reference to the accompanying drawings wherein.

Figure 1:
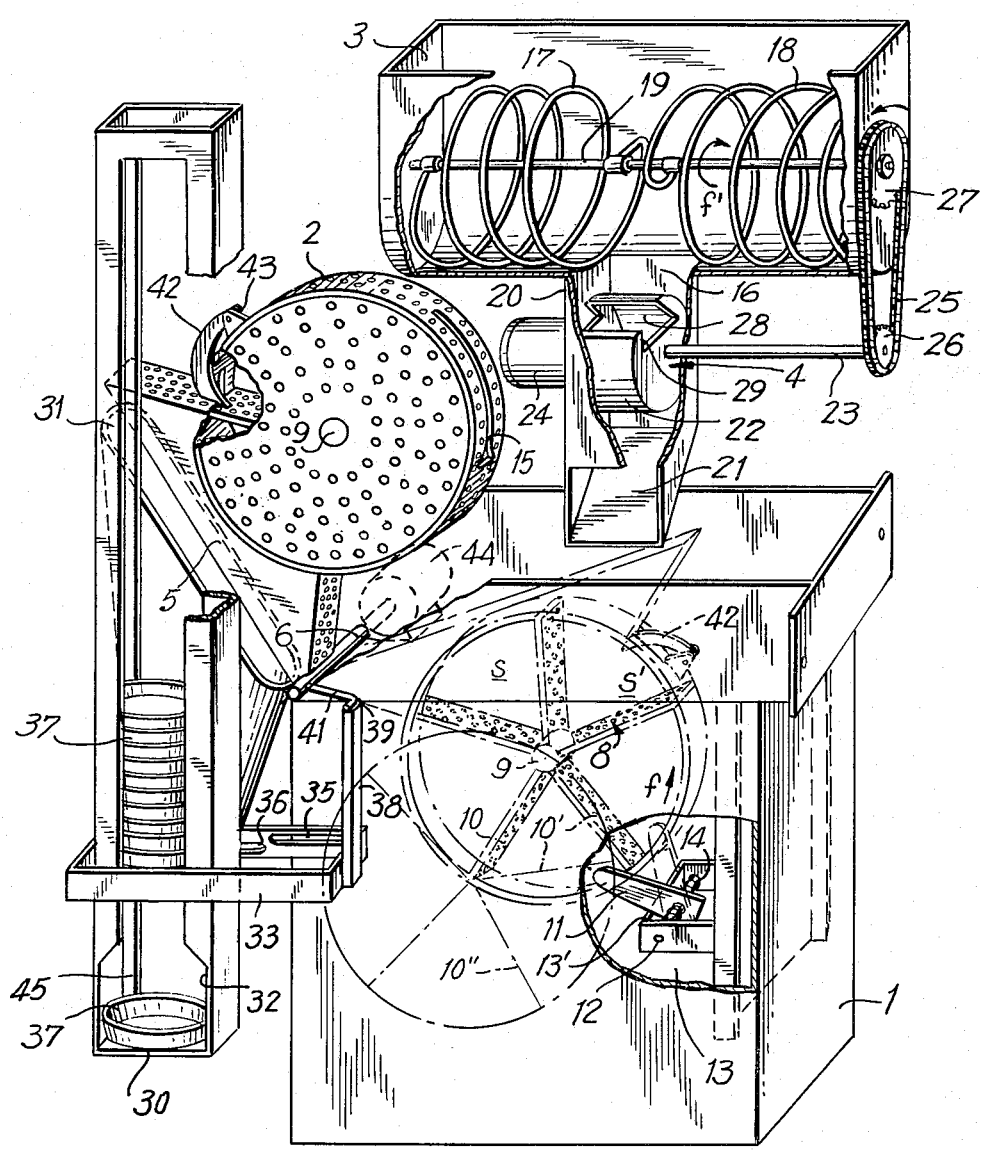
FIG. 1 is a diagrammatic perspective view partly broken away of apparatus according to the invention.

Referring to the drawings, the apparatus comprises a tank 1 containing oil in which a perforated metal basket 2 of cylindrical shape is periodically inserted and which is previously loaded with predetermined portions of food products distributed from a storage magazine 3 by means of a measuring device 4 which will be described hereinafter.

The basket 2 is provided with an aperture for introducing the product, into which aperture is fixed a chute 5 in the shape of an inverted truncated pyramid. The basket-and-chute unit is pivoted at one corner of the chute to a horizontal spindle 6 mounted on the upper edge of the tank 1. This unit can therefore pivot about the axis of spindle 6 between a first limiting position, illustrated in full lines, in which the basket 2 is outside the tank and the aperture of its chute 5 is directed downwards, and a second limiting position, illustrated in chain-dotted lines, in which the basket and the chute are completely immersed in the oil, the aperture of the chute being in this case directed upwards. An intermediate position is illustrated in FIG. 1 in dotted lines, in which position a portion of the food product distributed by the measuring device is introduced into the basket. A driving motor 44 is coupled to sprindle 6 in order to impart an alternating downward and upward pivoting movement to the basket-and-chute unit.

As will be perceived from the intermediate position of the unit, the inside of the basket is divided into compartments by means of a measured-quantity distributor in the form of a bladed wheel 8 mounted so as to rotate freely about a spindle 9. The blades are in the form of perforated radial partitions 10. In the embodiment shown, the internal volume of the basket is divided into five sectors, but it is clear that it may comprise a different number thereof, smaller or greater The bladed wheel 8 is designed to rotate one sector at a time in the direction of the arrow f, so that each time the basket-and-chute unit moves downwards a new sector comes into position substantially opposite the aperture in the chute 5. In order to impart this abrupt rotary movement to the bladed wheel 8, an abutment 11 is pivotably mounted on a spindle 12 carried by supporting plates 13 is in the tank 1, and in the path of the basket as it finishes its stroke towards its bottom position. The abutment normally occupies its lower position in abutment on the upper edge of plate 13', illustrated in solid lines, and may be urged towards a top position, illustrated in dotted lines, against the action of a helical spring 14 threaded around the spindle 12. The abutment 11 is capable of entering the basket through an elongated slit 15 in the cylindrical wall of the basket, and of projecting into one of the sectors of the bladed wheel.

The abutment can therefore cause the bladed wheel to rotate in the direction of the arrow $f$ when the backet-and-chute unit pivots downwards; nevertheless, it cannot cause the wheel to rotate in the opposite direction when the unit moves upwards again, because the basket 12 is provided with a pawl, 42 (biassed by spring 43), which opposes such rotation. The location of the abutment 11 is such that the relative rotation of the wheel with respect to the basket is equal to one sector.

The storage magazine 3 is in the form of an enclosure having a semicylindrical base in which there is a central aperture 16 for the product to pour through. The product is directed towards the aperture 16 by means of two wire coils 17, 18 which are secured at of their ends with a driving spindle 19 co-axial with the cylindrical base the magazine. The directions in which the coils are wound are opposite to one another, so that when the spindle 19 is driven in the direction of the arrow $f^1$ the coils push the product towards the aperture 16.

A casing 20 comprises an inclined passage 21 containing the measuring device 4 and in communication with the aperture 16. The device 4 is in the form of a cylinder 22 carried by a shaft 23 parallel to the spindle 19 of the coils. The cylinder 22 is rotationally driven by a motor and reduction gear 24 which also drives the coils 17 and 18 by way of a transmission comprising a chain 25 and pinions 26, 27. The cylinder 22 has in its lateral wall an axial recess 28 the volume of which is approximately equal to that of the measured quantity of product to be distributed. The leading edge of the recess is equipped with a blade 29 capable of slicing off excess product.

Figure 2:
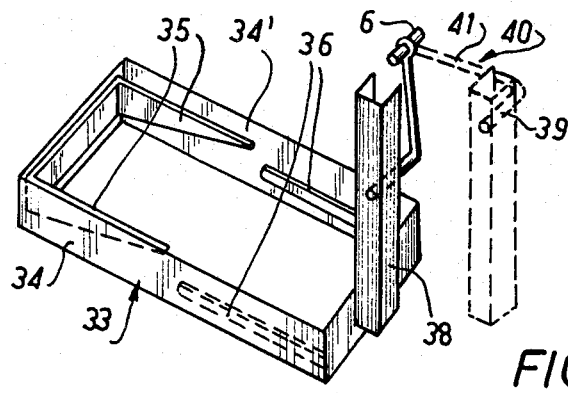
FIG. 2 is a perspective view of a receptacle distributor of the apparatus of FIG. 1.
Figure 4:
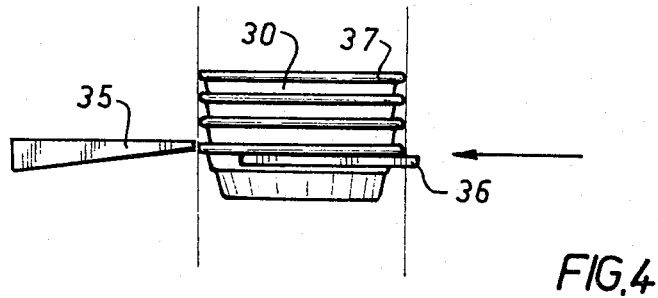
Figure 5:
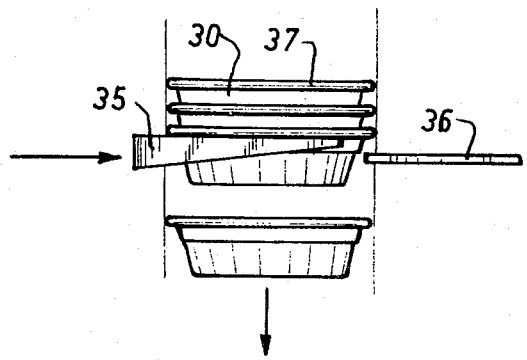

The apparatus also comprises a distributor for distributing containers intended to receive the measured quantity of fried product tipped out of the basket. The distributor comprises a guide column 31 in which a stack of containers 30 slides downwards simply under the action of gravity. The lower portion of the column 31 has an aperture 32 accessible to the consumer. Around the column 31 there is a horizontal frame 33, more clearly illustrated in FIG. 2. On the internal walls of two of its parallel sides 34, 34', the frame comprises two pairs of ledges 35, 36 intended to support the column of containers by way of a rim 37 of the bottom container of the stack. The pair of ledges each extend over about half the length of the sides 34, 34'. The ledges 35 are disposed at a higher level than the ledges 36, the offset being at least equal to the thickness of the rim 37 (see FIGS. 3 to 5). The frame carries out a periodic reciprocating movement parallel to the direction of the sides 34, 34'. In order to effect acquire this reciprocating movement, the frame is fast with a vertical U-section bar 38, between the sides of which there engages one arm 39 of a cranked lever 40 which is articulated at the end of its other arm 41 to the pivoting spindle 6 of the basket-and-chute unit. The arrangement is such that when the unit is in its top position the arm 41 is in a substantially horizontal position, the frame then being urged to the right by the arm 39 of the lever (position illustrated in FIG. 1), and that when the unit is in its bottom position the arm 41 is substantially vertical, the frame then being urged to the left in FIG. 1.

In the right-hand position of the frame (FIG. 3) the stack of containers rests on the ledges 35; when the frame is moved to the left (FIG. 4) the stack drops onto the ledges 36, and finally when the frame returns to its right-hand position the ledges 35 engage between the rims of the bottom two containers and as a result separate the bottom container of the stack which drops into the aperture 32 of the column 31. It will be noted that the ledges 35 have a tapered profile, which facilitates their introduction between the rims.

Figure 3:
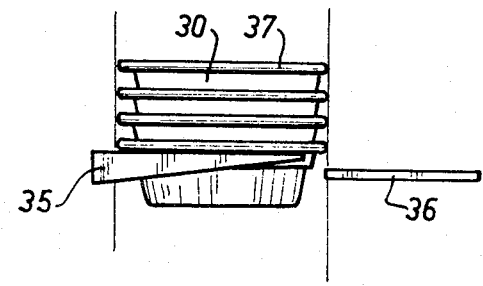
FIGS. 3 to 5 illustrate sequences of the distribution of receptacles in the course of a working cycle of the apparatus.

The apparatus which has just been described operates as follows:

At rest, the basket-and-chute unit is in its upper position, and the frame 35 is pushed back to the right (position of FIG. 3). When a consumer sets the appliance in motion, for example by means of a coin or token, the basket-and-chute unit pivots downwards. At the same time, the product passing through the aperture 16 drops into the recess 28 in the cylinder 22, which it fills. The motor 24 starts at the end of a predetermined period, thus driving the cylinder 22 and the coils 17, 18 through one revolution.

At the end of half a revolution by the cylinder, the portion driven into the recess 28 flows along the inclined passage 21 and drops into the chute 5 of the basket 2, which has at this instant arrived at the intermediate position illustrated. The bladed wheel 8 is then so located in the basket that one of its sectors, S, is opposite the chute 5. The portion arriving via the passage 21 therefore enters the sector S. The basket continues on its downward stroke, and the abutment 11, which is in the bottom position, enters the basket through the slit 15. In the intermediate position illustrated, the abutment comes into contact with the partition 10', and forces the wheel 8 to rotate in the basket as the latter descends. When the basket reaches the end of its stroke, the bladed wheel 8 has rotated through about one sector, so that the following sector S', containing a portion of product which is now sufficiently cooked, comes into position opposite the chute 5. While the basket is immersed, the portion in the sector S undergoes a first cooking.

At the end of a predetermined period, the basket-and-chute unit moves upwards, the partition 10'' coming into contact with the underside of the abutment 11. Nevertheless, the wheel 8 remains in a fixed position in the basket because the latter is provided with the pawl 42. The partition 10'' moves the abutment 11 away from its rest position against the force of the spring 14, and when the partition has become free of the abutment the latter is returned to its lower position under action of spring 14. Having reached the top of its stroke, the basket tips the fully cooked portion out of the sector $S^1$. The cooked portion then be transferred by any suitable means into a container 30 which was separated from the stack by the ledges 35 while the basket was moving upwards, as hereinbefore explained. The appliance is then in its initial state. In the following cycle, the compartment S', which has just emptied, receives a portion of product from the magazine. Because of the abrupt manner in which the wheel 8 pivots, the compartments rotate through one sector on each cycle, so that in the case of FIG. 1 each portion of product undergoes five successve cookings before being made available to the consumer.

The above described apparatus therefore enables perfectly cooked portions of food products to be served one by one in a relatively short time, as they are ready.

What is claimed is:

1. Apparatus for cooking and distributing measured quantities of hot food products, the apparatus comprising a tank for containing a hot cooking liquid; a basket and chute unit consisting of a perforated basket having an aperture and a chute in communication with the aperture for introducing food products into the interior of the basket and for removing food products therefrom; means for moving the unit between a first position in which the basket is immersed in the cooking liquid and a second position in which the basket is withdrawn from the tank; means for partitioning the interior of the basket into sectors each intended to contain one measured quantity of food product, said partitioning means being mounted so as to be rotatable in the basket; a device for imparting rotation to said partitioning means to cause the partitioning means to rotate through one sector each time the basket-and-chute unit moves towards one of said positions of the basket; a magazine for containing a reserve of the food product to be cooked and provided with an aperture through which said product can pour and including means for driving the product towards said aperture; a two-position productmeasuring member which, in a first position, takes from the aperture of the magazine a predetermined portion of product, and in its second position allows said portion to pour into the chute of the basket, a driving mechanism for moving the measuring member in synchronism with the movement of the basket-and-chute unit; means for receiving a stack of receptacles each intended to receive a cooked portion of product which is tipped from one of the sectors of the basket; and a mechanism for distributing said receptacles in synchronism with the movement of the basket-and-chute unit and operable to bring an end receptacle from the stack into a position accessible to the consumer.

2. Apparatus according to claim 1, wherein said distributing mechanism is operable to bring said end receptacle into position before the cooked product portion is tipped out.

3. Apparatus according to claim 1, wherein said basket and chute unit is pivotally mounted.

4. Apparatus according to claim 3, wherein the pivot of the unit is located on the chute and comprises a horizontal spindle journalled in the tank.

5. Apparatus according to claim 1, wherein the partitioning means comprises a rotatable wheel comprising a plurality of perforated radially extending partitions.

6. Apparatus according to claim 5, wherein said wheel is rotatable in one direction only, said device for rotating said partitioning means comprising an abutment disposed in the tank, said abutment being disposed so as to enter the basket through a slit provided in the latter and to relatively move along this slit while the basket is moving towards its immersed position in order to come to bear against and rotate a partition on the wheel situated downstream of the abutment considered in the direction of wheel rotation.

7. Apparatus according to claim 6, wherein said abutment is mounted for pivoting about a spindle between a biased lower position in which it is disposed while the basket is moving downwards towards the tank and an upper position towards which it is urged while the basket is moving upwards against its bias by a partition situated upstream of the abutment, said wheel remaining immovable with respect to the basket during this upward movement.

8. Apparatus according to claim 1, wherein the product driving means comprises at least one spiral element rotationally driven about its axis in such a direction as to push the product towards the aperture in the magazine.

9. Apparatus according to claim 1, wherein the measuring member comprises a cylindrical element mounted so as to rotate in the aperture of the magazine and having a peripheral wall with a recess whose volume corresponds to that of the measured quantity of product to be distributed, said recess coming alternately into position below the aperture of the magazine in order to be loaded with product and above the chute of the basket into which the measured quantity of product is tipped.

10. Apparatus according to claim 1, wherein the receptacle-distributing mechanism comprises a guide column for slidably receiving a stack of receptacles each comprising a projecting lip, and a frame mounted around the column for a reciprocating movement transvere of the column, said frame carrying two pairs of ledges each for supporting the stack of receptacles by the lip of the bottom receptacle in the stack, said pairs of ledges being offset in height by a distance substantially equal to the height of a receptacle lip and being so disposed on the frame as to take it in turns to support the stack of receptacles each time the movement of the frame changes direction.

11. Apparatus according to claim 10, wherein the upper two ledges have a tapered shape which enables them to be introduced between the lips of two lowermost receptacles in the stack and to separate the bottom receptacle.

12. Apparatus according to claim 10, comprising a cranked lever having two arms, the reciprocating movement of the frame being effected by said cranked lever one of the arms of which is fast with the pivoting spindle of the basket-and-chute unit, and the other arm is engaged inside a vertical U-section bar fast with the frame.

* * * * *